(12) United States Patent
Caffiau et al.

(10) Patent No.: US 9,144,945 B2
(45) Date of Patent: Sep. 29, 2015

(54) FIBER APPLICATION MACHINE INCLUDING FLEXIBLE FIBRE-CONVEYING TUBES PROVIDED WITH FLEXIBLE BLADES

(75) Inventors: Johann Caffiau, Hennebont (FR); Olivier Le Borgne, Lorient (FR); Yvan Hardy, Lorient (FR); Alexander Hamlyn, Ploemeur (FR)

(73) Assignee: Coriolis Composites, Lyon (FR)

( * ) Notice: Subject to any disclaimer, the term of this patent is extended or adjusted under 35 U.S.C. 154(b) by 150 days.

(21) Appl. No.: 14/119,139

(22) PCT Filed: May 15, 2012

(86) PCT No.: PCT/FR2012/000195
§ 371 (c)(1),
(2), (4) Date: Nov. 20, 2013

(87) PCT Pub. No.: WO2012/160270
PCT Pub. Date: Nov. 29, 2012

(65) Prior Publication Data
US 2014/0182787 A1 Jul. 3, 2014

(30) Foreign Application Priority Data
May 20, 2011 (FR) .................................... 11 54449

(51) Int. Cl.
*B29C 70/38* (2006.01)
*B65H 57/12* (2006.01)

(52) U.S. Cl.
CPC ............. *B29C 70/384* (2013.01); *B29C 70/382* (2013.01); *B65H 57/12* (2013.01); *B65H 2701/314* (2013.01)

(58) Field of Classification Search
CPC .. B29C 70/382; B29C 70/384; B29C 70/386; B29C 70/388
See application file for complete search history.

(56) References Cited

U.S. PATENT DOCUMENTS

| | | | | |
|---|---|---|---|---|
| 3,692,601 | A * | 9/1972 | Goldsworthy | 156/169 |
| 6,251,185 | B1 * | 6/2001 | Morrison et al. | 118/681 |
| 7,387,147 | B2 * | 6/2008 | Johnson et al. | 156/433 |
| 2002/0090408 | A1 * | 7/2002 | Dahl et al. | 425/80.1 |
| 2008/0202691 | A1 * | 8/2008 | Hamlyn et al. | 156/441 |

FOREIGN PATENT DOCUMENTS

| | | |
|---|---|---|
| EP | 0 697 990 | 2/1996 |
| FR | 2 912 953 | 8/2008 |
| WO | WO 2006/092514 A2 | 9/2006 |
| WO | WO 2008/122709 A1 | 10/2008 |
| WO | WO 2009/081805 A1 | 7/2009 |
| WO | WO 2010/049424 A1 | 5/2010 |

* cited by examiner

*Primary Examiner* — Jeff Aftergut
(74) *Attorney, Agent, or Firm* — Patterson Thuente Pedersen, P.A.

(57) ABSTRACT

The present invention relates to a fiber application machine, for making components out of composite materials, comprising a fiber application head, fiber storing means, and means for conveying the fibers from said storage means to the application head. The conveying means comprises first flexible tubes, that receive one fiber into its internal passage. Each flexible tube is provided with at least one longitudinal flexible blade of rectangular cross section. Each first flexible tube and its associated flexible blade are placed in a second flexible tube so that the second flexible tube holds the flexible blade substantially against the first flexible tube, while allowing relative longitudinal movement of the flexible blade in relation to the first flexible tube.

15 Claims, 7 Drawing Sheets

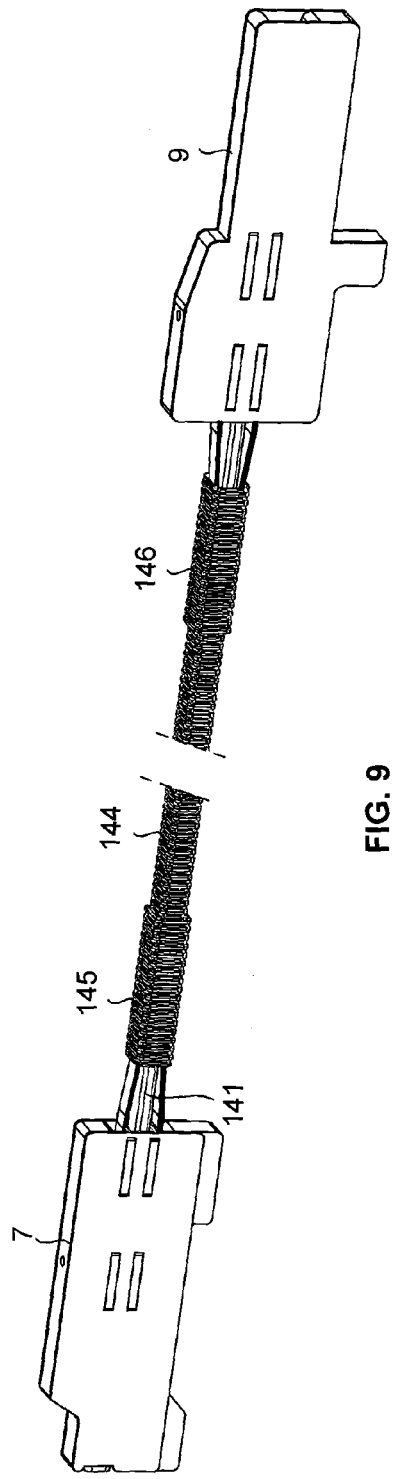
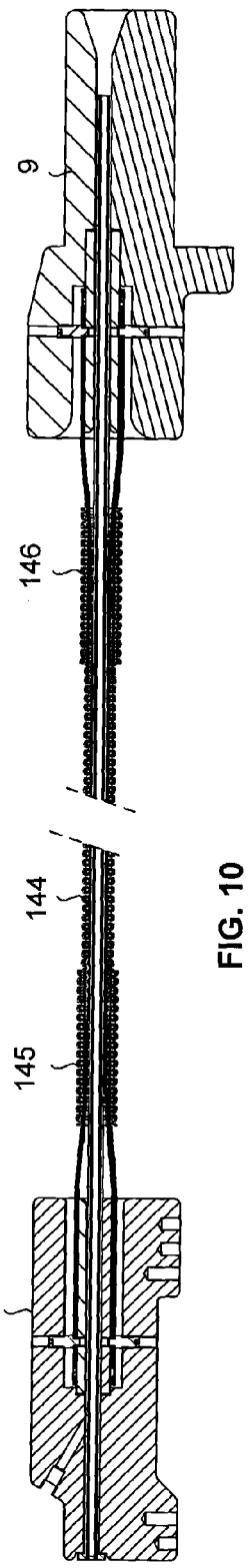
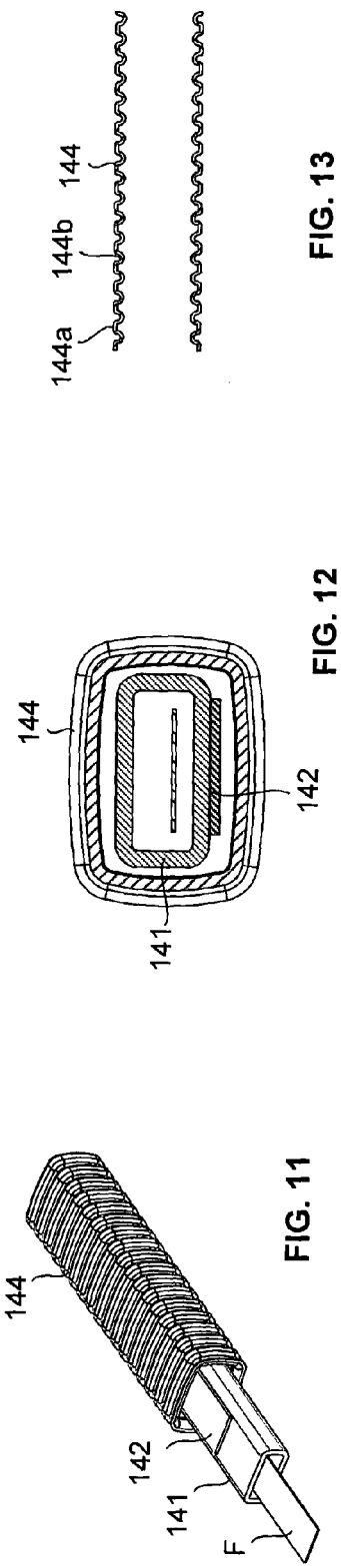
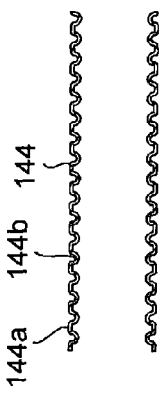
FIG. 9
FIG. 10
FIG. 11
FIG. 12
FIG. 13

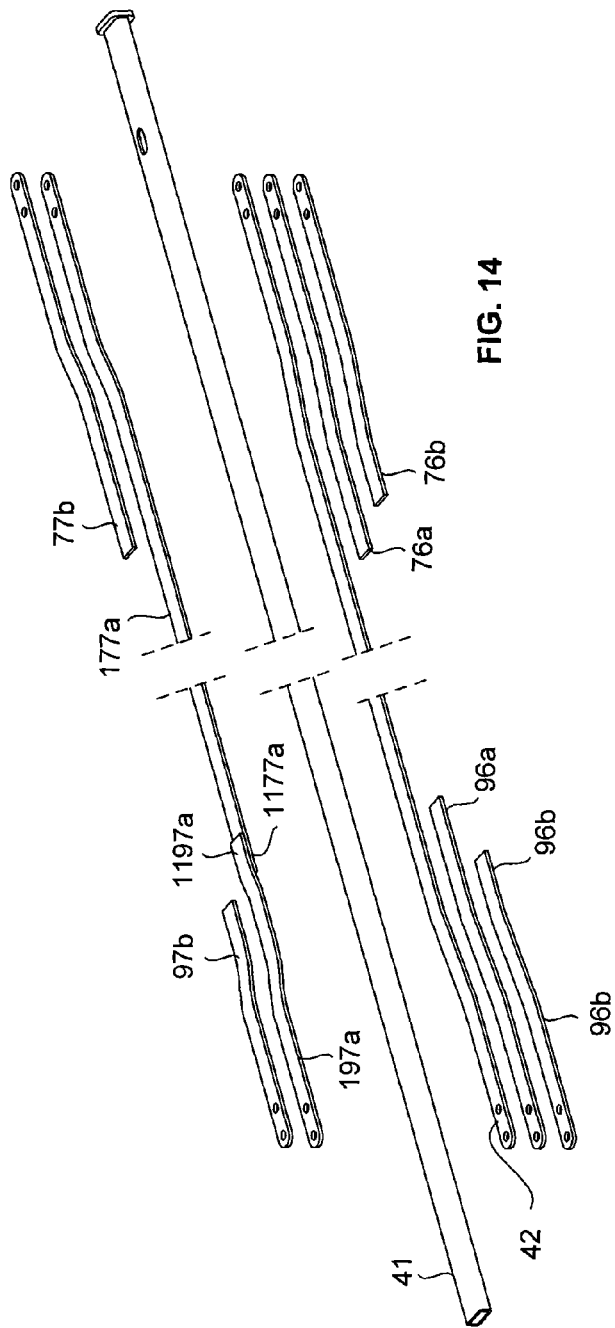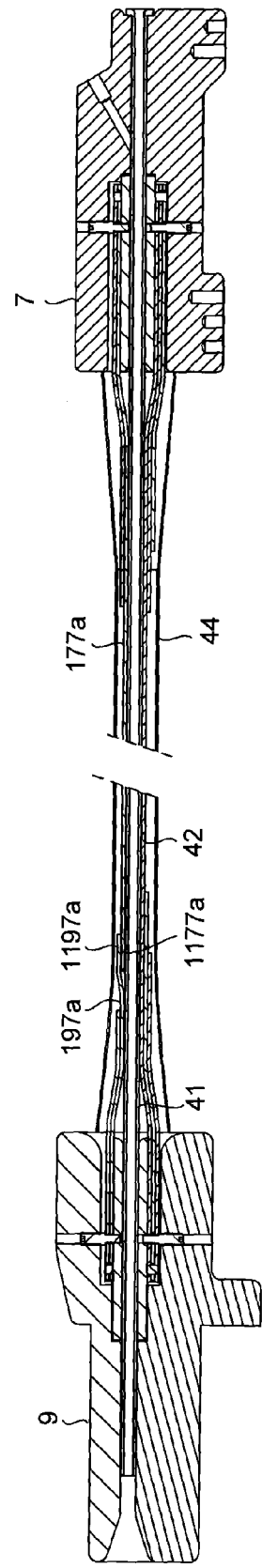

FIBER APPLICATION MACHINE INCLUDING FLEXIBLE FIBRE-CONVEYING TUBES PROVIDED WITH FLEXIBLE BLADES

PRIORITY

The present application is a National Phase entry of PCT Application No. PCT/EP2012/000195, filed May 15, 2012, which claims priority from FR Patent Application No. 1154449, filed May 20, 2011, which applications are hereby incorporated by reference in their entireties.

FIELD OF THE INVENTION

The present invention relates to a fiber application machine, for making components out of composite materials, and more particularly fiber conveying means particular to a machine of this kind for conveying the fibers between fiber storage means and the application head.

BACKGROUND OF THE INVENTION

There are known fiber application machines, commonly known as fiber placement machines, for the application by contact on a layup tool, such as a male or female mold, of a wide band of several flat continuous fibers, ribbon-like, dry or impregnated with thermosetting or thermoplastic resin, in particular carbon fibers, consisting of a plurality of carbon filaments or threads.

These machines comprise a system for moving a fiber application head, said head comprising an application roller intended to come into contact against the mold to apply the band and means for guiding the fibers onto said application roller, the fiber storage means, and means for conveying fibers from said storage means to the application head.

In the patent document WO 2008122709, it was proposed to use conveying means comprising flexible tubes connecting the storage means to the application head, each flexible tube being able to receive a fiber in its internal passage. The flexible tubes are attached by their ends to the application head and to the storage means respectively by the upstream and downstream attachment means, and have sufficient length and flexibility as not to restrict the movements of the head displacement system. Each flexible tube is provided with at least one longitudinal flexible blade of rectangular cross-section, said flexible blade being arranged substantially parallel to the plane of transport of the fiber received in the internal passage of the flexible tube.

Such flexible tubes form conveying means that are simple in design, do not take up much space and are of reduced cost, making it possible to obtain high movement speeds, to place remotely the storage means from the displacement system, to eliminate the motor-driven slack recovery systems for fiber spools, to isolate the fibers from the outside, and to simplify the displacement system of the application head, particularly to use a displacement system such as a multi-articulated arm of the six-axis robot type.

The flexible blade associated with each tube restricts or prevents the transverse bending of the tube in the plane of the blade, which allows the risks of the fiber turning over in the internal passage of the flexible tube parallel to the blade to be eliminated, or at the very least restricted, especially when certain movements of the robot, due to excessive bending of the flexible tubes and/or excessive friction of the fibers in the flexible tubes. The flexible tube can perform bending movements in a direction perpendicular to the plane of the blade and twisting movements to allow the fiber placement head to move in all directions.

The assembly of the blade and the flexible tube is effected by means of an adhesive tape, the adhesive tape wound in a helical way around the tube and the blade to flatten it against the flexible tube. The set is covered by a protective sheath.

This assembly has proved to be long and fastidious to perform.

The purpose of the present invention is to provide a machine with conveying means ensuring a good fiber conveyance, which are simple to make.

SUMMARY OF THE INVENTION

The present invention provides a fiber application machine comprising
 a fiber application head, comprising an application roller and means for guiding the fibers onto said application roller,
 preferably, a system for moving the fiber application head,
 a means of storage for the fibers, and
 means for conveying fibers from said storage means to the application head, said conveying means comprising first flexible tubes, so called conveying tubes, connecting the storage means to the application head, each first flexible tube being able to receive one fiber into its internal passage, the first flexible tubes being mounted by end to the application head and to the storage means respectively by attachment systems, each flexible tube is provided with at least one longitudinal flexible blade of rectangular cross section, said flexible blade being arranged substantially parallel to the plane of transport of the fiber received in the internal passage of the flexible tube,
 characterized in that each first flexible tube and its associated flexible blade are placed in a second flexible tube, so called holding or guiding tube, so that said second flexible tube holds said flexible blade substantially against the first flexible tube, while allowing relative longitudinal movement of the flexible blade in relation to the first flexible tube.

According to the invention, the assembly of the first flexible tube and a separate blade is made by a second flexible tube, said assembly system holds the blade substantially in contact with the flexible tube while allowing relative longitudinal movement of the flexible blade in relation to the first tube. Such an assembly proves simple to perform. The second flexible holding tube ensures a sliding type connection between the first flexible conveying tube and the flexible blade.

Moreover, such an assembly which permits longitudinal movement or sliding between the first flexible tube and the second flexible tube facilitates the longitudinal bending of the flexible tube in a direction perpendicular to the plane of the flexible blade, in two opposite directions, the flexible tube having substantially the same stiffness in said two opposite directions, although the flexible blade is placed on one side of the tube. Longitudinal bending can be performed in two opposite directions, without damaging the assembly between the flexible tube and the flexible blade.

According to one embodiment, the flexible blade extends substantially over the entire length of the first flexible tube, the first flexible tube and the flexible blade being assembled by their end portions of said attachment systems to allow relative longitudinal movement of the flexible blade in relation to the first flexible tube.

According to one embodiment, one of the elements among the flexible blade and the first flexible tube is assembled in a fixed manner by its end portions to the attachment systems, the second element being assembled with freedom of longitudinal movement by at least one of its end portions to one of the attachment systems.

According to one embodiment, said second element is assembled by one of its end portions to an attachment system with longitudinal freedom of movement, and is assembled without freedom of movement by its other end portion to the other attachment system.

According to one embodiment, the flexible blade is assembled without freedom of movement by its end portions to the attachment systems.

According to one embodiment, the first flexible tube is assembled without freedom of movement by one so called upstream end to the so called upstream attachment system assembled to the storage means, and is assembled with freedom of longitudinal movement by its downstream end portion to the so called downstream attachment system assembled to the application head.

According to one embodiment, the first flexible tube has a longitudinal outer surface portion substantially flat, along which the flexible blade is held by the second flexible tube.

According to one embodiment, the first flexible tube has a substantially rectangular cross section, the flexible blade being held by the second flexible tube along one of the two large sides of the first flexible tube.

According to one embodiment, the second flexible tube has a substantially rectangular cross section.

According to one embodiment, said flexible blade is metallic, and/or the first flexible tube is made of plastic material, preferably high density polyethylene, more preferably antistatic high-density polyethylene, and preferably said second flexible tube is made of plastic material.

According to one embodiment, the second flexible tube is corrugated. Such second corrugated tube has a high flexibility in all directions, and thus do not limit or not significantly limit the longitudinal bending of the first tube in the direction perpendicular to the plane of the flexible blade.

According to one embodiment, each attachment system comprises a support or cassette for each first flexible tube, each support having a main through passage in which is mounted the first flexible tube by an end portion, and a secondary passage in which the flexible blade is mounted by one end portion.

According to one embodiment, each attachment system comprises second rigidifying means acting against the first flexible tube opposite said flexible blade and possibly against the flexible blade to at least limit the longitudinal bending of the first flexible tube in one direction perpendicular to the plane of the blade at the outlet of said attachment systems. According to one embodiment, the secondary rigidifying means comprises at least the first flexible secondary blade, preferably rectangular cross section, mounted on the attachment system, and coming in abutment against the first flexible tube opposite to the flexible blade. Said secondary rigidifying means can comprise for each attachment system, at least one pair of first secondary flexible blades, preferably of rectangular cross-section, mounted on the attachment systems, one of which abuts against the flexible blade, and the other abuts against the first flexible tube opposite to the flexible blade. A pair of second secondary flexible blades can abut against the first secondary flexible blades.

According to one embodiment, the first secondary blades of the two attachment systems which are in abutment against the first flexible tube have free end portions which overlap, the free end portion of a first secondary blade of an attachment system, from which the first flexible tube is inserted for its assembly, being interposed between the first flexible tube and the free end portion of the first secondary blade of the other attachment system. In another embodiment, the first secondary blade of the attachment systems that come against the first flexible tube are formed from a single continuous flexible blade, said blade being assembled with a freedom of longitudinal movement by at least one of its end portions to one of the attachment systems.

The flexible tubes are preferably assembled in at least one row by their end portions to the application head and to the storage means by the attachment systems, for receiving and delivering the fibers in the form of a layer, the cassettes being assembled flat one against the other on a support plate.

The conveying means can further comprise means of fluidization able to fluidize a fiber when it is transported in the internal passage of a first flexible tube. Said fluidizing means can comprise air injection means, for example mounted on the upstream attachment system, able to inject air or other types of gases in the internal passage of each flexible tube at the level of its upstream end portion, to create an air flow in the direction of the transport of fibers. The air stream is preferably conditioned, i.e. temperature and/or humidity regulated by, and purified to avoid any pollution of fibers. The fluidization means can further comprise vibration means able to make said flexible tubes vibrate. Advantageously, said fluidizing means are mounted on the upstream attachment means.

Advantageously the machine comprises a displacement system able to move the application head in at least three directions perpendicular to each other. Said displacement system advantageously comprises a robot comprising a wrist or multi-articulated arm at the end of which is mounted said application head. The displacement system can be formed by a multi-articulated arm of the type of a standard six axes robot, arranged on the ground or mounted on linear axis or a gantry.

The fiber storage means can comprise a creel in the case of fibers packed in the form of spools and/or racks in the case of fibers packed in the form of bundles or in cartons. These storage means can be arranged on the ground, for example in the case of a fixed standard robot, or mounted on an element of the displacement system, for example on a follower carriage sliding on the linear axis of the robot.

The invention will be better understood and further aims, details, features and advantages will become more apparent from the following detailed explanatory description of currently preferred particular embodiments of the invention with reference to the accompanying schematic drawings in which:

BRIEF DESCRIPTION OF THE DRAWINGS

FIG. 9 is a partial schematic perspective view of the conveying means according to an alternative embodiment;

FIG. 10 is a longitudinal sectional view of the conveying means of FIG. 9;

FIGS. 11 and 12 are schematic views respectively in partial perspective and cross sectional of the flexible conveying tube of FIG. 9;

FIG. 13 is a schematic longitudinal sectional view of the second flexible tube for holding the flexible blade and the flexible conveying tube, and, FIGS. 14 and 15 are partial schematic exploded perspective views and in longitudinal section of the conveying means according to a second alternative embodiment.

DETAILED DESCRIPTION OF THE DRAWINGS

Figure 1:
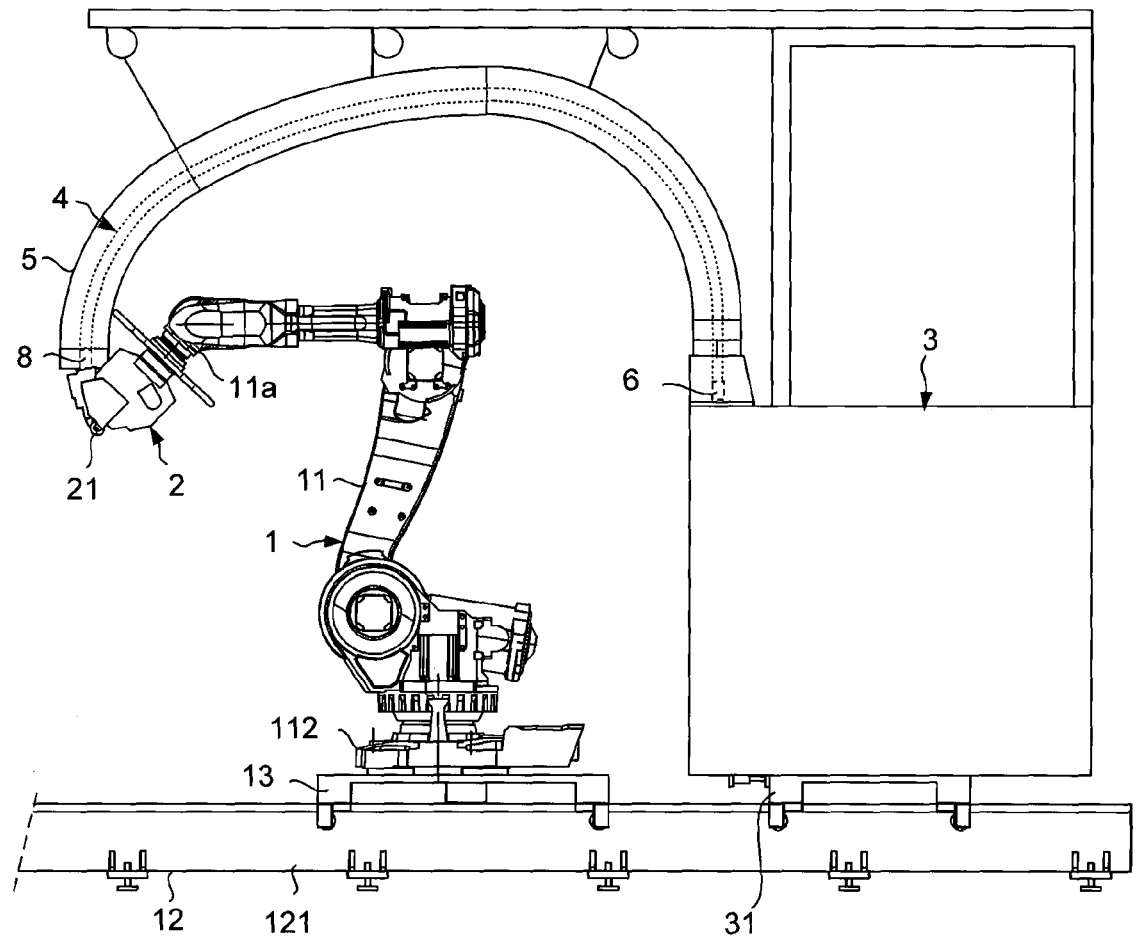
FIG. 1 is a schematic side view of a placement machine according to the invention.

In reference to FIG. 1, the placement machine comprises a displacement system 1 formed of a multi-articulated arm 11 of the six-axis robot type, known per se, mounted mobile on a linear axis 12, an application head 2 mounted at the wrist end 11a of a multi-articulated arm, the fiber storage means 3, and conveying means for conveying fibers from said storage means to the application head.

The multi-articulated arm 11 is fixed at its base 112 of a carriage 13 mounted to slide on the linear axis 12, said linear axes consisting in two parallel rails 121 fixed to the ground. The carriage is equipped with drive means, for example motor-driven roller type, automatically controlled by a control unit for the displacement of the placement head along these rails.

The fiber application head 2, also called fiber placement head comprises in a known manner, an application roller 21 able to come into contact with a mold for applying a band formed of several fibers, for example pre-impregnated with resin.

The machine is provided for the application of fibers, such as carbon fiber type F, packaged in the form of spools. The storage means is in the formed of a creel, schematically represented under reference number 3 for receiving the fiber spools. Each spool is mounted on a mandrel of the creel, advantageously equipped with an automatic braking system controlled in closed loop as a function of the tension of the fiber, as described in patent document EP 697990. The creel is also mounted on a follower carriage 31 placed on the rails 121 and mechanically connected to the carriage 13 carrying the robot.

The machine comprises a control unit (not shown) for controlling the movements of the robot in accordance with the programmed sequences, the fiber placement head, particularly the jacks of the individual cutting systems and rerouting systems.

Electrical, pneumatic and/or hydraulic circuits for controlling the placement head are arranged in a pipe (not shown) extending from the placement head to the control unit, along the robot arm.

The conveying means comprising the first flexible tubes, so called conveying tube, are fitted with flexible rigidifying blades. The fibers are fed individually into the conveying tubes of the creel 3 to the fiber placement head 2.

Figure 4:
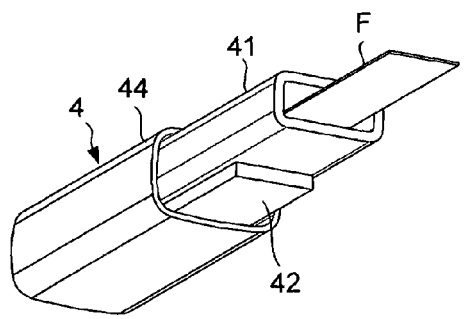
FIG. 4 is a partial schematic perspective view of a flexible conveying tube.
Figure 5:
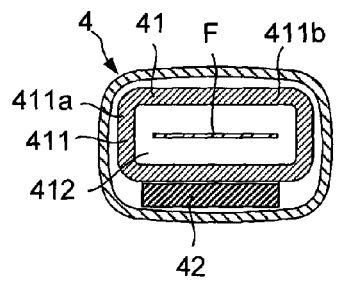
FIG. 5 is a schematic cross-sectional view of a flexible conveying tube.

With reference to FIGS. 4 and 5, each conveying tube 41 has a wall 411 of rectangular cross section with two small sides 411a and two large sides 411b. The wall 411 has an inner surface and an outer surface substantially planar. Each conveying tube is externally fitted over substantially its entire length with a flexible metal blade 42, also known as a foil. The metal blade and the conveying tube are placed in a second flexible tube 44, so called holding, having a substantially rectangular cross section so as to keep the blade substantially parallel to the outer surface of a large side 411b of the conveying tube, and substantially in contact with said surface, while allowing relative longitudinal movement of the blade in relation to the conveying tube. The blade has a width less than or equal to that of a large side, preferably less. The conveying tube fitted with its blade and placed in the holding tube is denoted by reference 4. Each conveying tube is intended to receive a flat fiber F in its internal passage 412 of rectangular cross section, substantially parallel to its large sides, and therefore parallel to the metal blade.

The metal blade prevents any transverse bending of the flexible tube in the plane of the blade, but allows longitudinal bending of the flexible tube in a direction perpendicular to the plane of the blade as well as twisting of the flexible tube. During displacement of the robot for the fiber placement operations, the flexible tubes will be distorted by bending perpendicular to the plane of the blade and/or twisting, so that the fiber F remains completely flat parallel to the metal blade.

The tubes are assembled into a beam, shown schematically under references 4A in FIG. 1, and are placed in the internal passage of a flexible sheath 5, as described in the patent document WO2010/049424. This sheath is cooled by cooling means, arranged in the cabinet of the creel able to inject cold gas into said internal passage of said sheath to cool and keep the fibers at a low temperature at which the fibers remain non-adhesive. The sheath, assembled by its upstream end and its downstream end, respectively to the creel and to the application head, has a sufficient length and flexibility so not to restrict the movement of the multi-articulated arm. To avoid that the sheath does not interfere with the movement of the head and/or come against the mold, the machine comprises a slack recovery system, acting on said sheath so that the downstream portion of the sheath remains substantially taut, particularly at the wrist, whatever the position of the head. Said slack recovery system includes at least one automatic cable winder, for example of the spiral spring type, mounted on a cross section support fixed to the creel, and the free end of the cable is fixed to the sheath.

The conveying tubes are fixed by the ends to the creel 3 and to the head respectively by upstream and downstream attachment systems represented schematically under references 6 and 8. To allow longitudinal movement between each conveying tube and its blade, each conveying tube is assembled in a fixed manner, i.e. fixed without freedom of movement, by its end portion of the attachment system upstream 6, and assembled in a mobile manner in longitudinal translation, i.e. fixed with freedom of longitudinal movement, to the downstream attachment system 8, while its associated blade is assembled in a fixed manner by its end portions to the upstream and downstream attachment systems.

Figure 2:
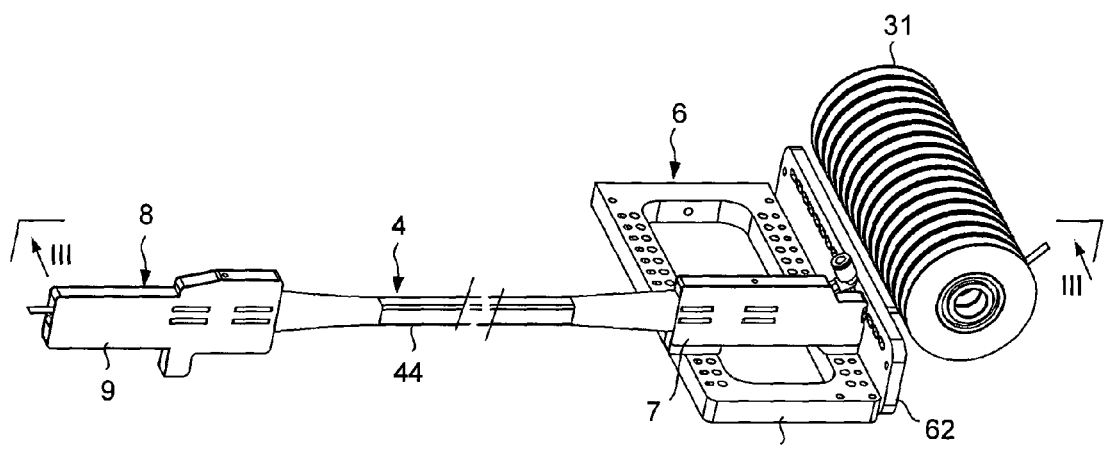
FIG. 2 is a partial schematic perspective view of the conveying means illustrating a flexible conveying tube and upstream and downstream attachment systems according to the invention.
Figure 3:
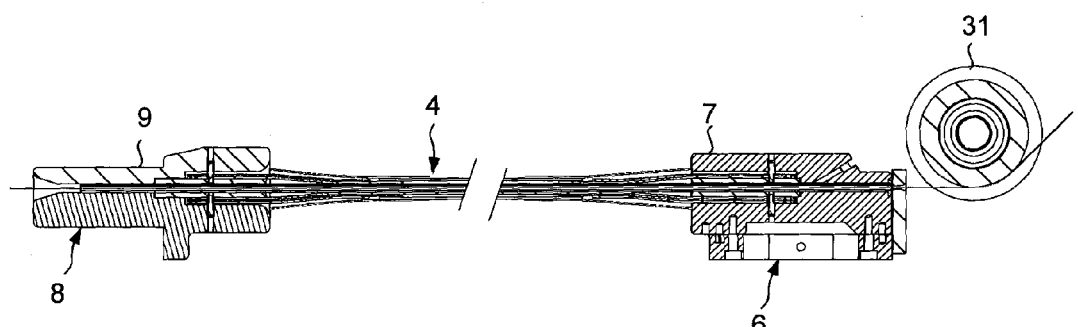
FIG. 3 is a schematic sectional view along the plane III-III of FIG. 2.
Figure 7:
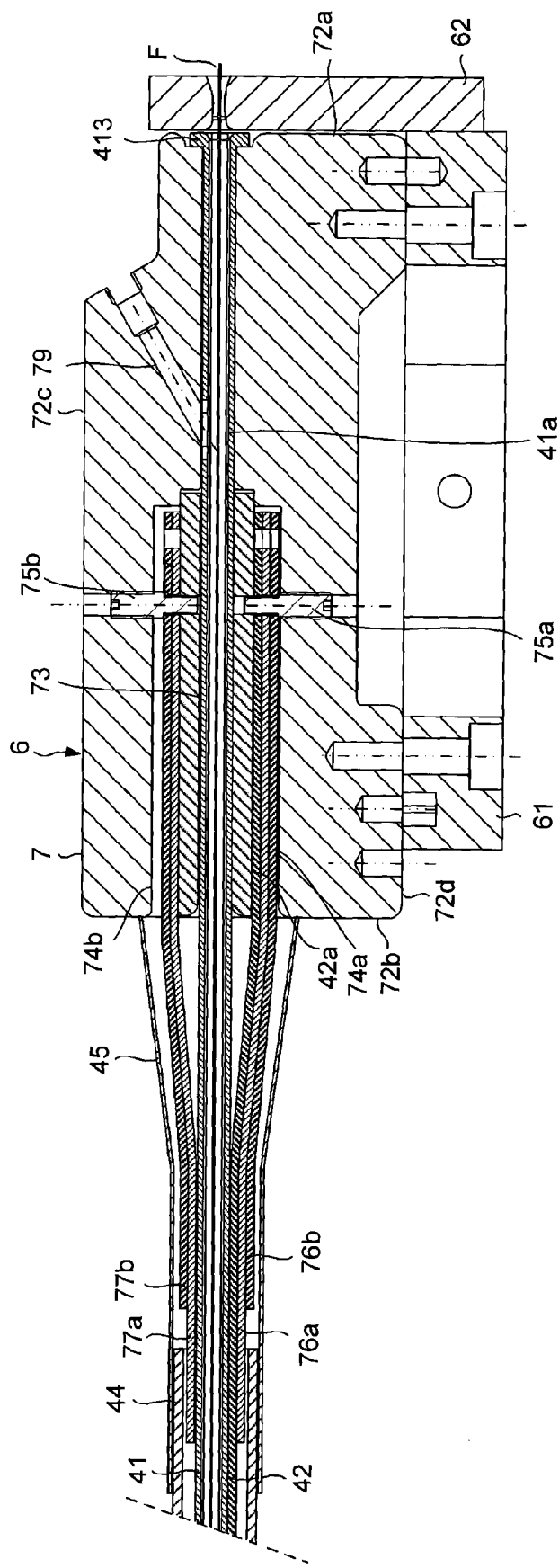
FIGS. 7 and 8 are partial enlarged views of FIG. 3 respectively at the level of the upstream attachment system and at the level of the downstream attachment system.

With particular reference to FIGS. 2, 3 and 7, the upstream attachment system 6 comprises for each conveying tube an upstream support 7 in the form of a parallelepipedic plate, also called upstream cassette, having two opposing main faces 71, an upstream edge 72a, a downstream edge 72b, an upper edge 72c and a lower edge 72d. The cassette has a main longitudinal passage 73 of rectangular cross section, opening onto the upstream and downstream edges 72a, 72b, in which the conveying tube is mounted by its upstream end portion 41a. The cassettes are mounted in a fixed manner by their lower edge 72d to a support plate 61, in the form of a row, the cassettes being placed flat against one another by their main faces 71, the support plate being mounted on the creel.

The section of the main passage 73 is arranged so that the conveying tube is rotationally blocked in said main passage. For its longitudinally blocking in the main passage, the upstream end portion 41a of the tube has a flange 413 abutting against the upstream edge 72a of the cassette, for example the flange is lodged in a recess of said upstream edge, and a eyelet plate 62 fixed to the support plate 61 coming in abutment against the upstream edges of the cassettes 7. The eyelet plate is provided with eyelets, for example of Teflon, to facilitate the entry of the fibers in the conveying tubes.

The cassette is provided with a first longitudinal secondary passage, parallel to the main passage, opening onto the downstream edge 72b of the cassette, and in which is mounted the upstream end portion 42a of the flexible blade, parallel to the large sides of the conveying tube. The flexible blade is blocked in longitudinal translation in this first secondary passage by means of a screw 75a, screwed from the lower edge 72d of the cassette and passes through a hole 421a of the upstream end portion of the blade.

To increase the stiffness of the flexible blade 42 at the output of the cassettes, and thus reduce the longitudinal bending of the flexible tube in the direction perpendicular to the plane of the blade at the output cassettes, second flexible blades are mounted on the cassette on both side of the conveying tube, and abut on one side against the conveying tube, and on the other side against the flexible blade. Two flexible secondary blades arranged flat one against the other are mounted in the first secondary passage receiving the flexible blade 42: a first secondary blade 76a is arranged flat against the main face of the flexible blade which is opposite the conveying tube, and a second secondary blade 76b, shorter than the first secondary blade, is arranged flat against the first secondary blade. The secondary blades 76a, 76b, of a cross section substantially identical to that of the flexible blade, are provided with holes 761a, 761b through which passes the aforementioned screw 75a for their blocking in the first secondary passage 74a. One or more pressure screws (not shown) screwed from the lower edge of the cassette can in addition be provided for coming into abutment against the second secondary blade 76b to complete the blocking of the three blades 42, 76a, 76b in the secondary passage 74a.

Analogously to, two other secondary blades, a first secondary blade 77a and a second secondary blade 77b, are mounted in a second secondary passage 74b arranged parallel to the main passage on the side of the conveying tube opposite to the flexible blade 42. The blocking of the secondary blades 77a, 77b in the second secondary passage is made by means of a screw 75b screwed from the upper edge and passing through the holes 771a, 771b of the secondary blades, and possibly by one or more pressure screws abutting against the second secondary blade 77b. At the output of the cassette, the first secondary blade 77a comes flat against the large side of the conveying tube which is opposite to the flexible blade 42, the second secondary blade shorter than the first secondary blade, is arranged flat against the first secondary blade.

Figure 6:
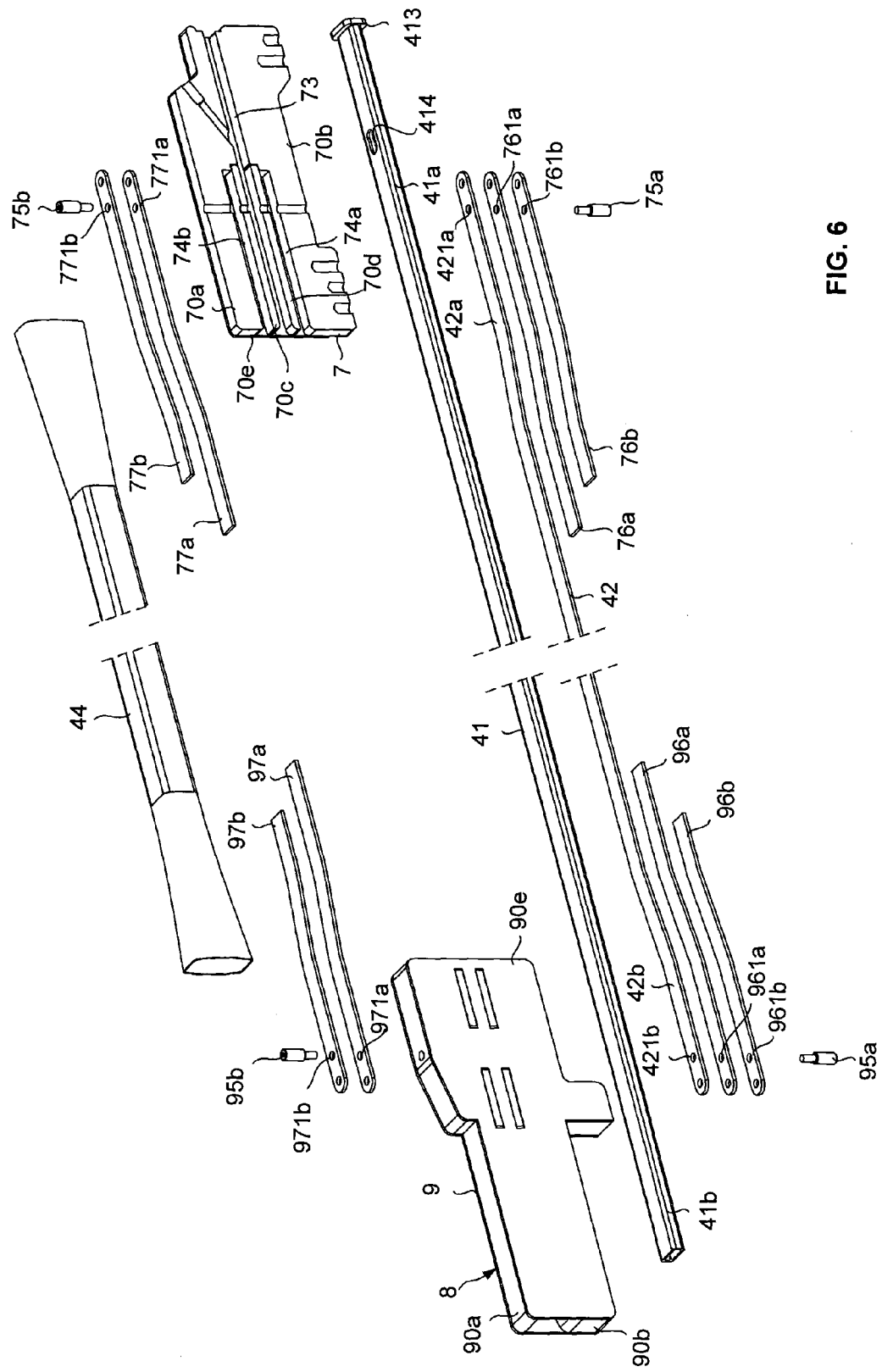
FIG. 6 is a schematic exploded perspective view of the different components constituting the conveying means.

By way of example, with reference to FIGS. 6 and 7, the cassette is made by means of an upper plate 70a, a lower plate 70b, and two platelets 70c, 70d mounted between two flanges 70e in such a manner to form between themselves the main passage 73 and the two secondary passages 74a, 74b. In reference to FIG. 6, in which one of the flanges has been removed, an upstream portion of the main passage 73 is formed between the upper and lower plates 70a, 70b, its downstream portion being defined between the two platelets 70c, 70d. A secondary passage 74a is defined between the lower plate 70b and a platelet 70d, the other secondary passage 74b being defined between the upper plate 70b and the other platelet 70c. The platelets are provided with threaded holes for screwing the screws 75a and 75b for blocking the blades.

Figure 8:
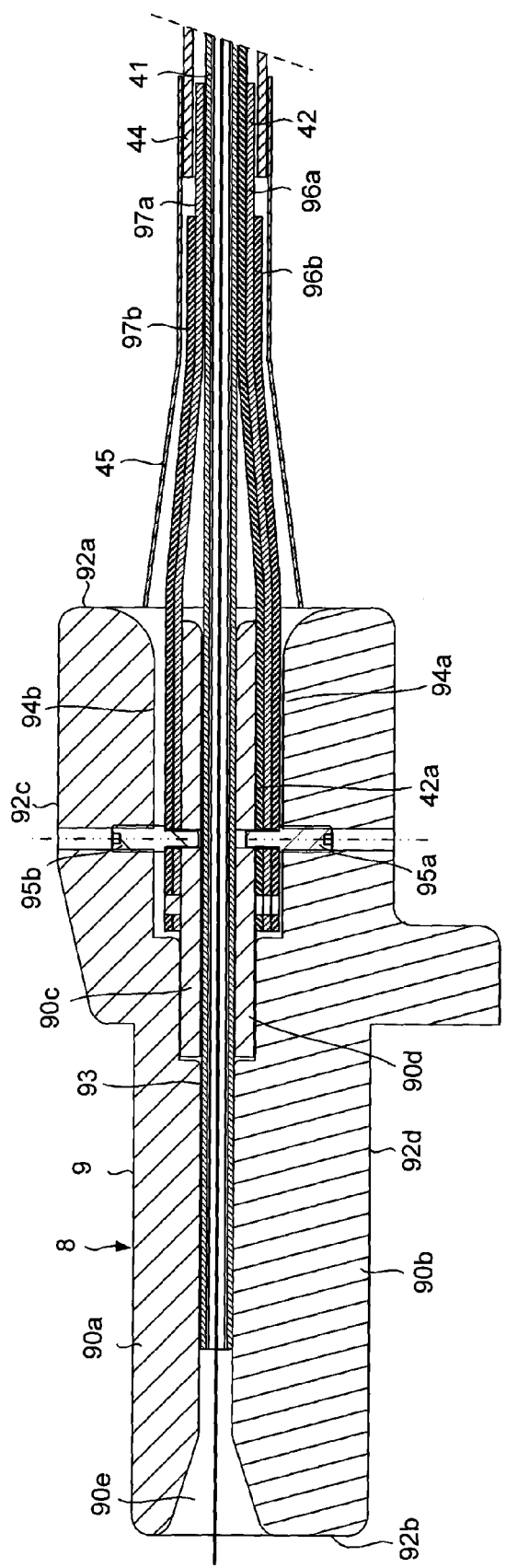

On the side of the placement head, the upstream attachment system 8 comprises for each conveying tube a downstream support 9, also called downstream cassette. With particular reference to FIGS. 6 and 8, each downstream cassette, under the form of a parallelepiped plate having two opposed main faces 91, an upstream edge 92a, a downstream edge 92b, an upper edge 92c and a lower edge 92d. The downstream cassette has a main longitudinal passageway 93, of rectangular cross section, leading to the upstream and downstream edges 92a, 92b, in which a conveying tube is mounted by its downstream end portion 41b. The downstream cassettes are mounted in a fixed manner by their lower edge 92d on a support structure of the fiber placement head, forming a row, the downstream cassettes being arranged flat one against the other by their main faces 91.

The downstream end portion 41b of the tube is mounted to slide in the main passage 93. The section of the main passage 93 blocks the rotation of the conveying tube in said main passage, the downstream end portion of the tube being free to move longitudinally in the main passage.

The cassette is provided with a first secondary longitudinal passage 94a, parallel to the main passage, opening onto the upstream edge 92a of the cassette, and in which is mounted the downstream end portion 42b of the flexible blade, parallel to the large sides of the conveying tube. The flexible blade is blocked in longitudinal translation in this first secondary passage by means of a screw 95a, screwed from the lower edge 92d of the cassette and passing through a hole 421b of the upstream end portion of the blade. Two secondary flexible blades arranged flat one against the other are mounted in the first secondary passage 94a receiving the flexible blade 42: a first secondary blade 96a is arranged flat against the main face of the flexible blade which is opposite to the conveying tube, and a second secondary blade 96b, shorter than the first secondary blade is arranged flat against the first secondary blade. The secondary blades, of a cross section substantially identical to that of the flexible blade, have holes 961a, 961b through which passes the aforementioned screw 95a for blocking them in the first secondary passage 94a. One or more pressure screws screwed from the lower edge of the cassette can also abut against the second secondary blade 96b to complete the blocking of the three blades 42, 96a, 96b in the secondary passage 94a.

Analogously to, two other secondary blades, a first secondary blade 97a and a second secondary blade 97b, are mounted in a second secondary passage 94b arranged parallel to the main passage on the side of the conveying tube opposite to the flexible blade 42. The blocking of the secondary blades 97a, 97b in the second passage is made by means of a screw 95b screwed from the upper edge and passing through holes 971a, 971b of the secondary blades, and possibly through one or more pressure screws coming in abutment against the second secondary blade 97b. At the output of the cassette, the first secondary blade 97a comes flat against the large side of the conveying tube which is opposite to the flexible blade 42, the second secondary blade shorter than the first secondary blade, being arranged flat against the first secondary blade.

At the end, the holding tube 44 is fitted on the first secondary blades 76a, 77a, 96a, 97a and stops before the ends of the second secondary blades. Sleeves 45 are fitted, and for example thermo-retracted, on the ends of the holding tube and on the second secondary blades 76b, 77b, 96b, 97b to block the holding tube longitudinally and hold the second secondary blades against the first secondary blades.

The downstream cassette is also made by means of an upper plate 90a, a lower plate 90b, and two platelets 90c, 90d mounted between two flanges 90e to together form the main passage 93 and two secondary passages 94a, 94b. In reference to FIG. 7, on which one of the flanges has been retracted, an upstream portion of the main passage is formed between the upper and lower plates 90a, 90b, its downstream portion being defined between the two platelets 90c, 90d, a secondary passage being defined between the lower plate 90b and a platelet 90d, the other secondary passage is defined between the upper plate 90a and the other platelet 90c. The platelets are provided with threaded holes for screwing the screws 95a and 95b for blocking the blades.

For example, to convey the fibers 6.35 mm in width, the conveying tubes have a rectangular inner cross section of 8×2 mm with a wall thickness of 1 mm, i.e. an outer cross-section of 10×4 mm. The flexible tubes are made of a flexible polymer material adapted for transporting the fibers, which does not break the fibers, does not charge the fibers with static electricity, generates little friction, resists wear and tear and has a good resistance to fatigue and repeated bending. The flexible conveying tubes are for example made of a polymer material such as natural high density polyethylene (HDPE), comprising an antistatic additive. In the absence of a metal blade, these conveying tubes can bend transversely. The metal blade has a width of about 5 mm, and a thickness of about 0.5 mm. The holding tube has for example a rectangular internal section of 7×11 mm, with a wall thickness of 0.5 mm, i.e. an outer section of 10×14 mm. The flexible holding tubes are made of a polymer material such as polyurethane or polyamide.

The conveying tube can for example slide in the main passage of the downstream cassette on a clearance of about 20 mm.

In the illustrated embodiment, the upstream attachment system enables a row of sixteen conveying tubes to be fixed for receiving the fibers of a layer of sixteen fibers leaving the creel. The attachment system is mounted by its support plate 61 on the creel, so that the ends of the conveying tubes are arranged in front of the output pulleys 31 of the creel. The downstream attachment system comprises a row of sixteen downstream cassettes for attaching the conveying tubes.

To improve the sliding of the fibers in the tubes, and thus ensure a good conveyance, the downstream attachment system is equipped with a fluidization means for fluidizing the fibers during their transport in the tubes. Each cassette comprises a channel 79 opening into the main passage 73, upstream from the blocks for example upstream from the blades. The end portion of the conveying tube is provided with an opening 414 arranged in front of the channel when the conveying tube is mounted fixed on the upstream cassette, so that each internal passage 412 of the tube opens on the channel. The channels of the cassettes are individually supplied with conditioned compressed air by conduits connected to a compressed air source (not shown), and each channel is orientated in a manner so as to form an upstream to downstream air flow in the internal passage of the tube. In the case of the transportation of pre-impregnated fibers whose stickiness decreases with temperature, cold and dry air is advantageously injected into the conveying tubes. To complete the air flow, a vibrator system, known per se, can be mounted on the support plate to vibrate all conveying tubes during the transportation of the fibers. The upstream attachment system is then assembled via its support plate to the creel by flexible connections of the silentbloc type to avoid the transmission of vibrations to the creel. The downstream cassettes, which do not comprise air injection channels nor a vibrator system, are however, assembled to the fiber placement head by flexible connections.

In the case of a placement head expected to receive the two layers of fibers, the conveying tubes will of course be assembled at the end in two rows, for example by means of two superimposed attachment systems.

Depending on the length of the conveying tubes and the type of fiber, one or more tension limiting systems, as described in detail in the aforementioned patent document WO2006/092514, comprising a set of motor driven parallel cylinders over which the fibers pass without going right around them, can be provided between the creel and the application head to reduce the tension of the fibers at the roller. A limiting system may for example be mounted on the multi-articulated arm of the robot. In this case, the fibers pass through first sections of the conveying tube equipped with a flexible blade and to a holding tube, fixed at the end to the creel 3 and the first limiter system respectively through the first upstream and downstream attachment system, then through second sections of the conveying tube equipped with a flexible blade and a holding tube, fixed at the end to the limiter system and to the fiber placement head respectively through the second upstream and downstream attachment systems, said upstream and downstream attachment systems being as described previously. A tension limiting system can be integrated at the output of the creel and/or at the input of the application head.

FIGS. 9 to 13 illustrate conveying means according to an alternative embodiment, which differs mainly from those described above by the fact that the holding tube is corrugated. As before, each fiber is individually conveyed in the internal passage of a conveying tube 141 of rectangular section. Each conveying tube is equipped with a flexible blade 142, the conveying tube and the flexible blade being placed in a holding tube 144 to hold substantially flat one against the other, while allowing them to slide between themselves.

The attachment of each conveying tube is made by means of an upstream cassette 7 and a downstream cassette 9, as described above. The conveying tube is assembled, without freedom of movement, in the main passage of the upstream cassette, and is assembled with freedom of longitudinal movement in the main passage of the downstream cassette. The flexible blade is assembled in a fixed manner, without freedom of movement in the secondary passages of the upstream and downstream cassettes. Each cassette is also equipped with secondary blades as described above to increase the stiffness of the flexible blade at the output of the cassette.

The holding tube is here a corrugated flexible tube of substantially rectangular section. The corrugated tube 144 includes outer rings 144a projecting towards the exterior of the corrugated tube and inner rings 144b projecting towards the interior of the corrugated tube. As shown in FIG. 12, the holding tube allows slight relative transverse movement of the flexible blade in relation to the conveying tube, and a relative rotational movement of the blade in relation to the conveying tube, but limited to a few degrees, the blade remains positioned between a large side of the conveying tube and a large side of the holding tube.

The holding tube extends over the major portion of the conveying tube, its maintaining in longitudinal position on the conveying tube is made feasible by two sections 145, 146 of corrugated tube, of a larger cross section. Each section is fitted on one side and possibly bonded onto the end portion of the holding tube and is fitted on the other side onto the secondary blades of a cassette for longitudinally blocking the holding tube and to progressively fold the flexible blade and the secondary blades to bring them against the conveying tube.

FIGS. 14 and 15 illustrate conveying means according to a second alternative embodiment, which differs from the embodiment of FIGS. 6 to 8 by the fact that the first secondary blades of the upstream and downstream cassettes coming against the conveying tube overlap.

The conveying means comprise, as before for each fiber, a conveying tube 41 and a flexible blade 42, placed in a holding tube 44 and mounted between an upstream cassette 7 and a downstream cassette 9. Secondary flexible blades are mounted as before on the upstream cassette and the downstream cassette, on either side of the conveying tube, and abut on one side against of the conveying tube 41, and on the other side against flexible blade 42. The first secondary blades 76a, 96a placed flat against the flexible blade, and the second secondary blades 76b, 96b placed flat against the first secondary blades 76a, 96a are identical to those in FIG. 6. However, the first secondary blade 177a of the upstream cassette 7 which is in abutment against the conveying tube extends as far as the first secondary blade 197a of the downstream cassette, and its free end portion 1177a is positioned under the free end portion 1197a of the first secondary blade 197a of the downstream cassette. This assembly allows easy replacement of the conveying tubes 41 from the upstream cassette 7, and in particular avoids the conveying tube abutting against the free end of the first secondary blade 197a of the downstream cassette when it is threaded in the holding tube from the upstream cassette. During longitudinal bending of the flexible tube, the end portion of the free end portion 1177a is able to move longitudinally between the free end portion 1197a and the conveying tube. The two secondary blades 77b, 97b, identical to those of FIG. 6, abut against the first secondary blades 177a, 197a. These first secondary blades 177a, 197a which overlap allow of course the reduction of longitudinal bending of the flexible tube in a perpendicular direction to the plane of the blade throughout its length.

Alternatively, the conveying tubes are threaded from the downstream cassette of the application head, the end portion of the first secondary blade of the downstream cassette is then placed between the conveying tube and the end portion of the first secondary blade of the upstream cassette.

In another alternative embodiment, the first secondary blades of the upstream and downstream cassettes which come against the conveying tube are replaced by a same flexible blade that extends from one cassette to another, said flexible blade being attached by end to a cassette and being able to slide longitudinally in a passage of the other cassette.

Although the invention has been described in conjunction with several specific embodiments, it is obvious that it is in no way limited thereto and includes all technical equivalents of the described means as well as their combinations if they are within the scope of the invention.

The invention claimed is:

1. A fiber application machine comprising
a fiber application head,
fiber storage means, and
conveying means for conveying the fibers from said storage means to the application head, said conveying means comprising first flexible tubes connecting the storage means to the application head, each first flexible tube being able to receive one fiber into its internal passage, the first flexible tube being mounted on the end of the application head and to the storage means respectively by an attachment systems, each flexible tube is provided with at least one longitudinal flexible blade of rectangular cross section,
characterized in that each first flexible tube and its associated flexible blade are placed in a second flexible tube so that said second flexible tube holds said flexible blade against the first flexible tube, while allowing relative longitudinal movement of the flexible blade in relation to the first flexible tube.

2. The machine according to claim 1, wherein the flexible blade extends substantially over the entire length of the first flexible tube, the first flexible tube and the flexible blade being assembled by their end portions of said attachment systems so as to allow relative longitudinal movement of the flexible blade in relation to the first flexible tube.

3. The machine according to claim 2, wherein one of the elements among the flexible blade and the first flexible tube is assembled in a fixed manner by its end portions to the attachment systems, the second element being assembled with a freedom of longitudinal movement by at least one of its end portions to one of the attachment systems.

4. The machine according to claim 3, wherein the second element is assembled by one of its end portions to the attachment system with a freedom of longitudinal movement, and is assembled without freedom of movement by its other end portion to the other attachment system.

5. The machine according to claim 3, wherein the flexible blade is assembled without freedom of movement of its end portions to the attachment systems.

6. The machine according to claim 5, wherein the first flexible tube is assembled without freedom of movement at an upstream end to the upstream attachment system assembled to the storage means, and is assembled with a freedom of longitudinal movement by its downstream end portion to the so called downstream attachment system assembled to the application head.

7. The machine according to claim 1, wherein that the first flexible tube has a longitudinal outer surface portion substantially flat, along which the flexible blade is held by the second flexible tube.

8. The machine according to claim 7, wherein the first flexible tube has a substantially rectangular cross section, the flexible blade being held by the second flexible tube along one of the two large sides of the first flexible tube.

9. The machine according to claim 1, wherein the second flexible tube has a substantially rectangular cross section.

10. The machine according to claim 1, wherein said flexible blade is metallic, the first flexible tube is of plastic material, the second flexible tube is of plastic material.

11. The machine according to claim 1, wherein the second flexible tube is corrugated.

12. The machine according to claim 1, wherein each attachment system comprises a support or cassette for each first flexible tube, each support having a main through passage in which is mounted the first flexible tube by an end portion, and a secondary passage in which is mounted the flexible blade by an end portion.

13. The machine according to claim 1, wherein each attachment system comprises secondary rigidifying means comprising at least a first secondary flexible blade mounted on the attachment system and in abutment against the first flexible tube opposite to the flexible blade.

14. The machine according to claim 13, wherein the first secondary blades of the two attachment systems (6, 8) which abut against the first flexible tube have free end portions which overlap, the free end portion of a first secondary blade of an attachment system being interposed between the first flexible tube and the free end portion of the first secondary blade of the other attachment system.

15. The machine according to claim 13, wherein the first secondary blades of the attachment systems that come against the first flexible tube are formed from a single continuous flexible blade, said blade being connected with freedom of longitudinal movement by at least one of its end portions to one of the attachment systems.

\* \* \* \* \*